US012702980B2

(12) United States Patent
Liu et al.

(10) Patent No.: US 12,702,980 B2
(45) Date of Patent: Aug. 11, 2026

(54) MICROFLUIDIC DEVICE AND SYSTEM

(71) Applicants: IMEC VZW, Leuven (BE); Katholieke Universiteit Leuven, KU LEUVEN R&D, Leuven (BE)

(72) Inventors: Chengxun Liu, Heverlee (BE); Camila Dalben Madeira Campos, Heverlee (BE); Xavier Rottenberg, Kessel-Lo (BE)

(73) Assignee: Imec VZW, Leuven (BE)

( * ) Notice: Subject to any disclaimer, the term of this patent is extended or adjusted under 35 U.S.C. 154(b) by 823 days.

(21) Appl. No.: 18/068,779

(22) Filed: Dec. 20, 2022

(65) Prior Publication Data

US 2023/0191411 A1 Jun. 22, 2023

(30) Foreign Application Priority Data

Dec. 22, 2021 (EP) .................................... 21216901

(51) Int. Cl.
*B01L 3/00* (2006.01)

(52) U.S. Cl.
CPC ... *B01L 3/502761* (2013.01); *B01L 3/502715* (2013.01); *B01L 2200/0652* (2013.01);
(Continued)

(58) Field of Classification Search
CPC ......... B01L 3/502761; B01L 3/502715; B01L 2200/0652; B01L 2300/0645;
(Continued)

(56) References Cited

U.S. PATENT DOCUMENTS 8,765,455 B2 7/2014 Beer et al.
2006/0226012 A1 10/2006 Kanagasabapathi et al.
(Continued)

FOREIGN PATENT DOCUMENTS

WO 2011002957 A2 1/2011

OTHER PUBLICATIONS

Caen, Ouriel, Simon Schutz, M. S. Jammalamadaka, Jeremy Vrignon, Philippe Nizard, Tobias M. Schneider, Jean-Christophe Baret, and Valérie Taly. "High-throughput multiplexed fluorescence-activated droplet sorting." Microsystems & nanoengineering 4, No. 1 (2018): 1-10.

(Continued)

*Primary Examiner* — Christine T Mui
(74) *Attorney, Agent, or Firm* — McDonnell Boehnen Hulbert & Berghoff LLP

(57) ABSTRACT

Embodiments for sorting particles are provided that include a microfluidic channel configured to receive a microfluidic flow that comprises a plurality of particles having different characteristics, the microfluidic channel having a plurality of output flow channels, a first detector configured to detect the location of the particles, a plurality of actuators located along the direction of the microfluidic flow and defining a sorting electrode arrangement. The microfluidic device further comprises a controller configured to receive signals from the first detector and to provide force field profiles for each of the plurality of particles, wherein each force field profile comprises a plurality of deflection force settings along the direction of the microfluidic flow. The controller individually addresses the plurality of actuators to generate a plurality of actuation inducing fields along the direction of the microfluidic flow to generate the deflection force settings in the force field profiles.

13 Claims, 9 Drawing Sheets

(52) U.S. Cl.
CPC .................. *B01L 2300/0645* (2013.01); *B01L 2300/0864* (2013.01); *B01L 2400/0424* (2013.01)

(58) Field of Classification Search
CPC ..... B01L 2300/0864; B01L 2400/0424; B01L 2300/0858; B01L 3/502746; B01L 2300/0663; B01L 2300/0816; B03C 5/005; B03C 2201/26; B03C 5/026; G01N 15/149; G01N 2015/1028
USPC .................................................. 422/502, 500
See application file for complete search history.

(56) References Cited

U.S. PATENT DOCUMENTS

2007/0152206 A1* 7/2007 Cho ........................ B03C 5/005 257/10
2019/0084011 A1* 3/2019 Imai .................. G01N 15/1484
2019/0158757 A1 5/2019 Zima et al.

OTHER PUBLICATIONS

Ahn, Keunho, Charles Kerbage, Tom P. Hunt, R. M. Westervelt, Darren R. Link, and David A. Weitz. "Dielectrophoretic manipulation of drops for high-speed microfluidic sorting devices." Applied Physics Letters 88, No. 2 (2006): 024104.

* cited by examiner

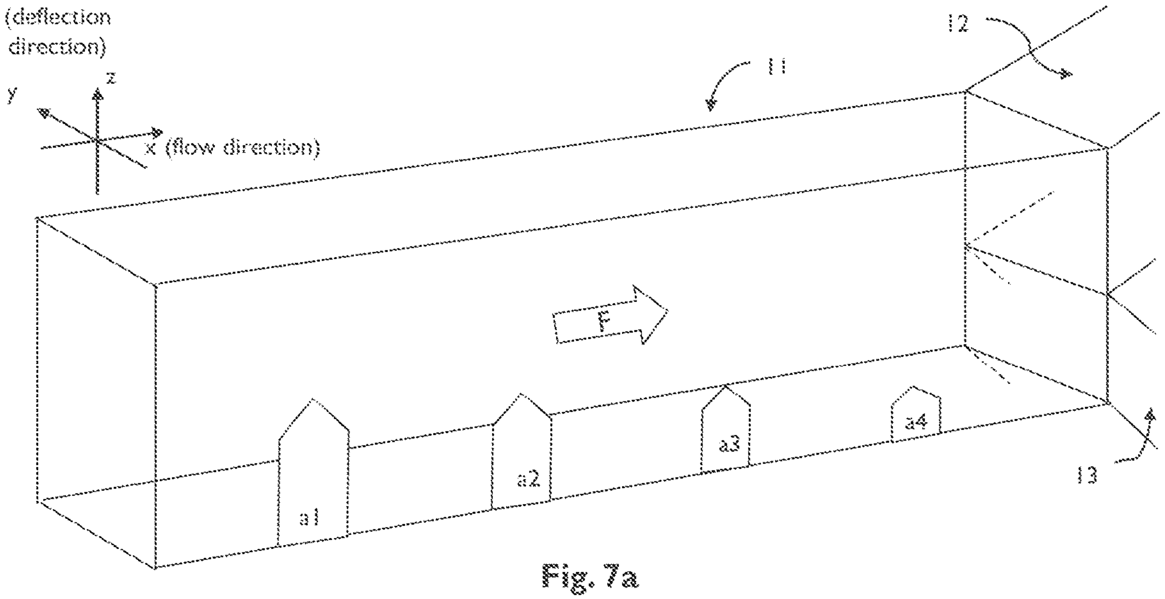
Fig. 7a
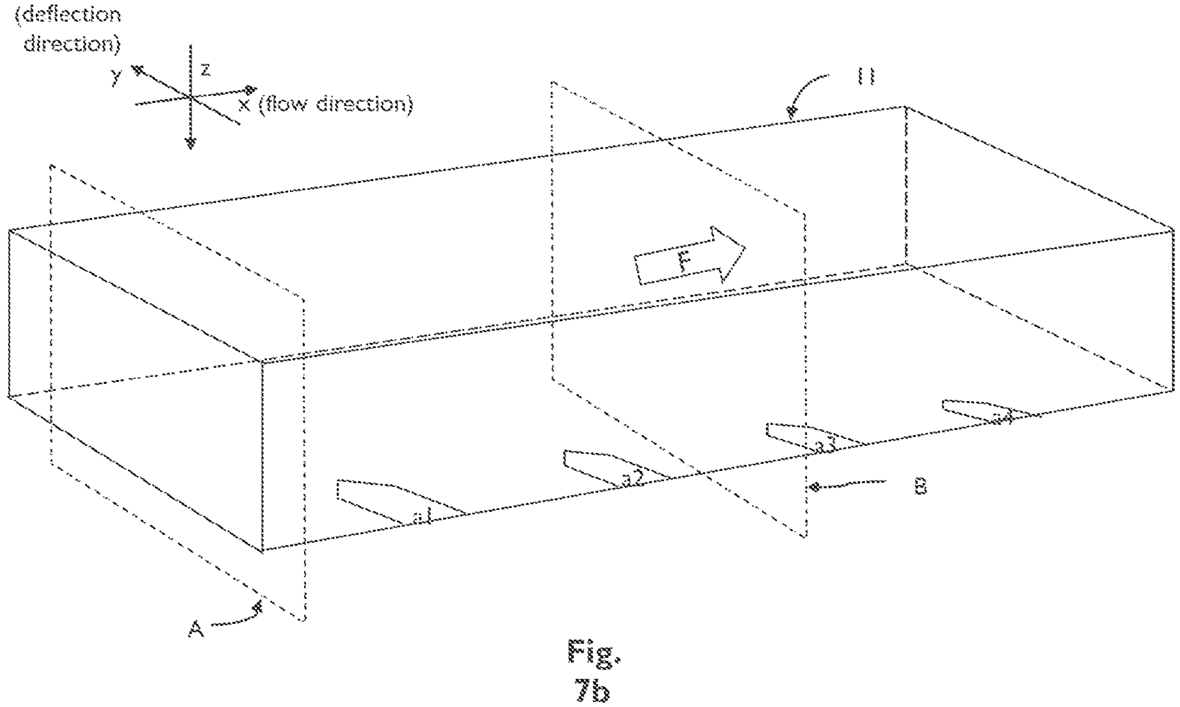
Fig.
7b

MICROFLUIDIC DEVICE AND SYSTEM

CROSS-REFERENCE TO RELATED APPLICATIONS

The present application is a non-provisional patent application claiming priority to European Patent Application No. EP 21216901.5, filed Dec. 22, 2021, the contents of which are hereby incorporated by reference.

TECHNICAL FIELD

The present disclosure is generally related to a microfluidic device and system and in some example embodiments to a microfluidic device and system for particle sorting or separation.

BACKGROUND

A microfluidic device and system for particle sorting or separation is an important assistance in chemical and biological analysis, diagnostics, food processing and environmental assessment.

A known technique for high-throughput particle sorting including multiple electrodes is explained in the document "*High-throughput multiplexed fluorescence-activated droplet sorting*", by Caen et al. Microsystems & Nanoengineering (2018) 4:33.

Another known technique for droplet sorting using multiple electrodes and a droplet identifier is explained in U.S. Pat. No. 8,765,455 B2 "Chip-based droplet sorting", by Neil Reginald Beer et al.

SUMMARY

According to a first aspect of the present disclosure, there is provided a microfluidic device for sorting particles comprising a microfluidic channel configured for receiving a microfluidic flow comprising a plurality of particles having different characteristics, the microfluidic channel having a plurality of output flow channels, a first detector configured to detect the location of the particles, a plurality of actuators located along the direction of the microfluidic flow and defining a sorting electrode arrangement.

The microfluidic device further comprises a controller (e.g., a microcontroller or other controller element(s) comprising one or more processors configured and/or programmed to perform the operations described herein). The controller is configured for receiving signals from the first detector, providing force field profiles for each of the plurality of particles wherein each force field profile comprises a plurality of deflection force settings along the direction of the microfluidic flow. Based on the provided force field profiles, the controller further individually addresses the plurality of actuators for generating a plurality of actuation inducing fields along the direction of the microfluidic flow wherein the actuation inducing fields is configured to generate the deflection force settings in the force field profiles, wherein the plurality of the force field profiles are different for each different particle and are provided to direct each particle in a gradual manner within the sorting electrode arrangement. The controller is therefore configured for gradually directing at least two different particles simultaneously within the sorting electrode arrangement. The actuation inducing fields can be arranged in tandem. The microfluidic device facilitates the pipelining of sorting for at least two different types of particles at the same time within the sorting electrode arrangement so that the particle sorting is multiplexed and time efficient.

According to an embodiment, the first force field profile gradually sorts the first particle to a first output flow channel and the second force field profile gradually sorts the second particle to a second output flow channel.

According to an embodiment, the deflection directions of all the deflection force settings in the same force field profile have the same polarity. The microfluidic device can sort the particles gradually and gently when the particles are sorted in the sorting electrode arrangement.

According to an embodiment, the controller comprises a second detector configured to determine the force field profiles for each of the plurality of particles. The second detector can be configured to classify the plurality of particles.

According to an embodiment, the actuation inducing fields are electric fields. The force field profiles are electric field gradient profiles.

According to an embodiment, the controller is configured for directing at least a first particle according to a first force field profile and for directing a second particle according to a second force field profile. Each force field profile comprises a first and a second deflection force settings. The controller simultaneously generates the first deflection force setting by the first actuation inducing field according to the second force field profile for the second particle and the second deflection force setting by the second actuation inducing field according to the first force field profile for the first particle. The controller is configured for individually and dynamically configuring the plurality of actuation inducing fields based on the location of the first and second particle. The microfluidic device can sort the particle accurately by adjusting the duration of each actuation inducing fields in a force field profile.

According to an embodiment, the plurality of actuators comprise a first conductive pillar array inside the microfluidic channel wherein the first conductive pillar array is adjacent to a first wall.

According to an embodiment, the plurality of actuators comprises a second conductive pillar array inside the microfluidic channel wherein the second conductive pillar array is adjacent to a second wall opposed to the first wall.

According to an embodiment, the height of conductive pillars of the first and second conductive pillar arrays is at least 80% of the height of the wall. According to an embodiment, the height of conductive pillars of the first and second conductive pillar arrays is equal to the height of the wall.

According to an embodiment, the plurality of actuators comprise a first actuator array located on a first side of a wall and a second actuator array located on a second side of the same wall, wherein the length of each actuator of the first actuator array is shorter than half of the width of the wall.

According to an embodiment, the width of the actuators used for generating the subsequent actuation inducing field is equal to or shorter than the width of the actuators used for generating the first actuation inducing field.

According to an embodiment, the microfluidic device further comprises a pair of centralizing electrodes configured to preset the entry point of the particles before the particles arrive at the sorting electrode arrangement.

According to an embodiment, the actuators are connected to a DC and/or AC voltage source.

According to an example embodiment, at least one deflection force settings are different in the force field profile GD1 and GD2.

According to a second aspect of the present disclosure, there is provided a particle processing device comprises the microfluidic device for sorting particles.

According to a third aspect of the present disclosure, there is provided a method for particle sorting in the microfluidic device comprising steps:

- providing that a microfluidic flow comprises a plurality of particles comprising at least a first particle and a second particle which has at least one different property from the first particle in the microfluidic channel;
- a first force field profile is configured for the first particle and a second force field profile is configured for the second particle; wherein when the first particle arrives at a predetermined first location before the first actuation inducing field, the first actuation inducing field is configured according to a first force field profile;
- and after the first particle arrives at a predetermined second location between the first and subsequent actuation inducing field, the subsequent actuation inducing field is configured according to the first force field profile;
- and wherein after the directly subsequent second particle arrives at the first predetermined location before the first actuation inducing field, the first actuation inducing electric field is configured according to a second force field profile;
- and wherein the steps in the previous two paragraphs overlap in time and wherein the first force field profile sorts first particle to a first output flow channel and the second force field profile sorts second particle to a second output flow channel;

According to a second aspect of the present disclosure, the force field profiles are determined based on the different chemical and/or physical and/or biological properties of the particles.

These as well other aspects, advantages, and alternatives will become apparent to those of ordinary skill in the art by reading the following detailed description, with reference where appropriate to the accompanying drawings.

BRIEF DESCRIPTION OF THE DRAWINGS

The disclosure will be further elucidated by means of the following description and the appended figures. Various exemplary embodiments are described herein with reference to the following figures, wherein like numeral denotes like entities. The figures described are schematic and are non-limiting. Further, any reference signs in the claims shall not be construed as limiting the scope of the present disclosure. Still further, in the different figures, the same reference signs refer to the same or analogous elements.

FIG. 7*a*, FIG. 7*b*, FIG. 7*c*, and FIG. 7*d* show 3-dimensional views of examples of different arrangement of the actuators located on the walls of the microfluidic device, according to example embodiments.

DETAILED DESCRIPTION

Figure 1A:
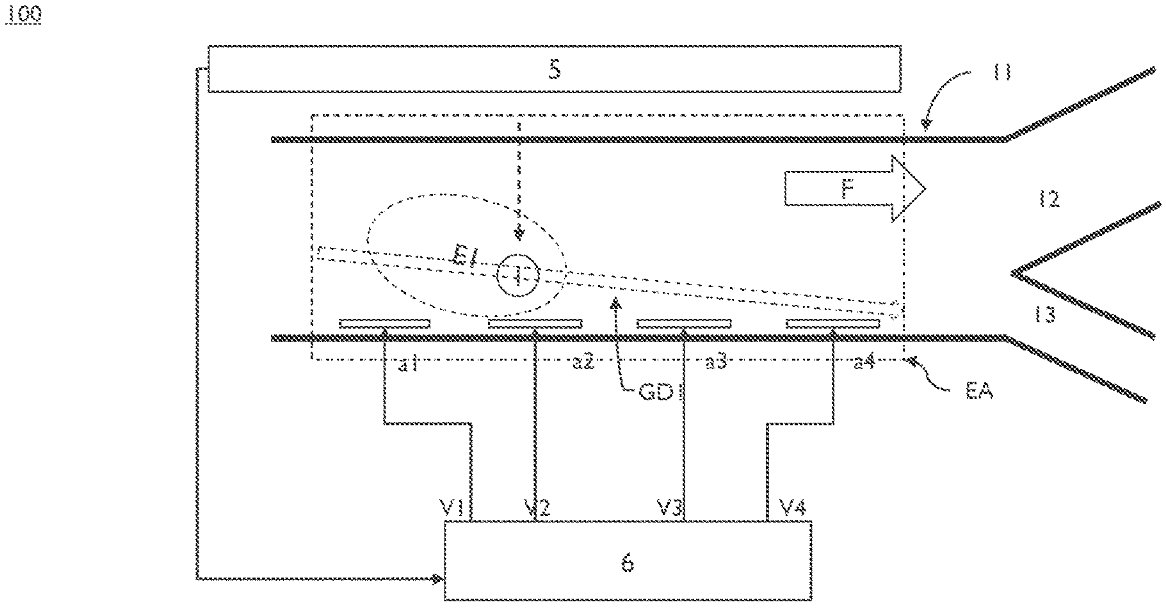
FIG. 1*a* and FIG. 1*b* show top views of an example microfluidic device for particle sorting, according to an example embodiment.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable with their antonyms under appropriate circumstances and that the embodiments described herein are capable of operation in other orientations than described or illustrated herein.

It is to be noticed that the term "comprising", used in the claims, should not be interpreted as being restricted to the features listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising A and B" should not be interpreted as being limited to devices consisting only of components A and B. It means that with respect to the present disclosure, the only relevant components of the device are A and B.

Where the term "about" is used to modify a strictly positive measure (e.g., a thickness, a distance, a temperature, a volume, a mass), this should be interpreted to encompass a range of measurements between 15% less than the measure (i.e., 85% of the measure) and 15% more than the measure (i.e., 115% of the measure), unless context dictates otherwise (e.g., if the text reads "a layer thickness of about 2.5 Angstroms (e.g., between 2.25 Angstroms and 3 Angstroms)," then the phrase "a layer thickness of about 2.5 Angstroms," in that context, should be interpreted to encompass layers having thicknesses in the range of 2.25 Angstroms to 3 Angstroms inclusive). So, for example, text reading "a distance of about 5 microns," absent context indicating the contrary, should be interpreted as distances between 4.25 microns and 5.75 microns.

Similarly, it is to be noticed that the term "coupled", also used in the claims, should not be interpreted as being restricted to direct connections only. The terms "coupled"

and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of example embodiments, various features are sometimes grouped together in a single embodiment, figure, or description thereof for the purpose of streamlining the disclosure and aiding in the understanding of one or more of the various aspects. This method of disclosure, however, is not to be interpreted as reflecting an intention that the claimed subject matter requires more features than are expressly recited in each claim. Rather, as the following claims reflect, various aspects lie in less than all features of a single foregoing disclosed embodiment. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, understood methods, structures, and techniques have not been shown in detail in order not to obscure an understanding of this description.

The following terms are provided solely to aid in the understanding of the present disclosure.

As used herein, a microfluidic channel is a channel for carrying a fluid. Such fluid can be a plain media such as Phosphate-buffered saline, water, or oil. Alternatively, the fluid could be a liquid specimen such as blood, sweat, saliva, urine, semen, or sewage water. The fluid may carry particles such as cells. The particles can be cells, bacterium, virus, extracellular vesicles, nucleic acids, proteins, organoids, hydrogel beads, or magnetic beads etc. The particles can also be artificial encapsulates such as aqueous droplets in oil. In some embodiments, the artificial encapsulates, e.g., droplets, comprise one or more particles. The microfluidic channel comprises a wall having a width from 1 μm to 1 mm. In some embodiments, microfluidic flow refers to a fluid volume between nanoliter to milliliter. According to an example embodiment, the cross-section of the microfluidic channel is rectangular in shape.

As used herein, the output flow channel refers to the microfluidic channels which receive the down steam of the fluid after a sorting event. A sorting event refers to a process through which a particular particle type is deflected in a fluid sample on the basis of its chemical and/or physical and/or biological properties. Such properties can be but not limited to size, morphological parameters, viability and both extracellular and intracellular protein expression, where they are applicable.

As used herein, a detector can be or include but is not limited to an optical detector. In some embodiments, the detector is an imaging device, such as a camera. In some embodiments, the detector is configured for fluorescent detection.

As used herein, a sorting electrode arrangement refers to the part of the microfluidic channel where all actuators, configured to generate actuation inducing fields for deflecting the particles, are located.

As used herein, a deflection plane crosses the microfluidic channel and a plurality of desired output flow channels. According to example embodiments, the deflection plane is in parallel to a wall of the microfluidic channel. A 3-dimensional coordinate system is used to define the directions in the microfluidic channel. In the figures, for example, the x-axis is the microfluidic flow direction, the z-axis is perpendicular to the deflection plane, and the y-axis is perpendicular to the z-axis and the x-axis. A deflection direction is the direction of the deviation of the particle perpendicular to the direction of the microfluidic flow in the deflection plane. According to example embodiments, the deflection direction is on the y-axis.

As used herein, a wall refers to each of the four structural barriers that form the microfluidic channel configured to contain the fluid comprising particles. The wall may also be referred to as a sidewall if the wall is on the xz-plane and the wall may also be referred to as a top or bottom wall if the wall is on the xy-plane. In embodiments, top/bottom walls and sidewalls are interchangeable.

As used herein, a wall has two longitudinal parallel edges in the direction of the fluid flow. The edges are normally the cross section of two walls. A wall central axis, as indicated for example in FIG. 7*c*, refers to the center axis of a wall having equal distance to the two edges of the wall. The wall central axis defines therefore two sides of the same wall.

Figure 7C:
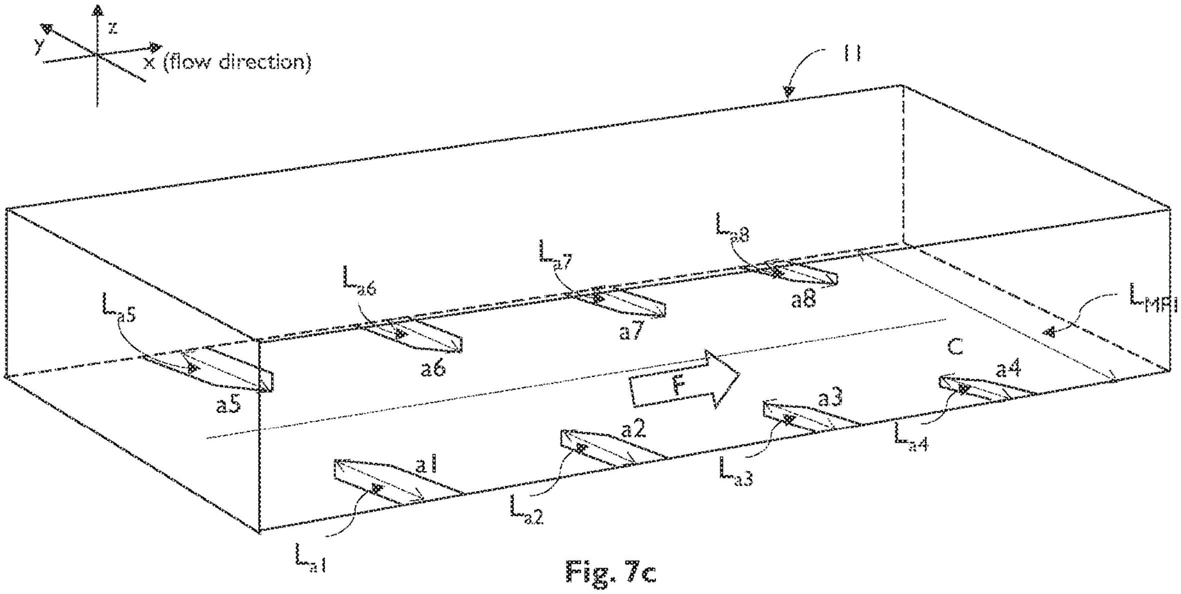

As used herein, the width of the wall, as indicated for example in FIG. 7*c*, is the distance between the two edges of a wall in the y-axis.

As used herein, the length, width and height of the actuators define the geometry of the actuators. When the actuators are located on or embedded in the walls, the length of the actuator is measured between the furthest edge of the actuator and the wall in the direction perpendicular to the microfluidic flow. The width is the furthest extension of the actuator in the direction of the fluid flow. When the actuators are conductive pillars inside the microfluidic channel, the height of the actuator is the furthest protrude height from the bottom wall. As used herein, an actuator refers to an electrode coupled to an electronic circuitry. A plurality of actuators are configured to convert electric signal to induce inhomogeneous fields for deflecting particles.

As used herein, an actuation inducing field is a field generated by at least one pair of actuators and the field deflects a particle in the microfluidic channel to deviate the particle from the direction of the fluid flow F. The actuation inducing field can be magnetic, acoustic and/or electric field. According to an embodiment, the field is an electric field. The electric field is generated between at least two actuators and induce dielectrophoretic (DEP) motion of a polarizable particle. As a result of the DEP motion, the particle is polarized by the electric field. Depending on the dielectric properties of the particle and the medium, the particle motion might be directed in different polarization and in different strength. DEP can be achieved in DC and/or AC electric fields.

As used herein, a deflection force setting is the deflection force applied on the particle in the deflection direction generated by an actuation inducing field between the pair of actuators. The deflection force setting comprises field type, field intensity and field polarization. A certain type of field type determines the sensitivity of a particle in such field. A certain field intensity determines the strength of the deflection force and therefore determines a deflection distance during a certain time period in the direction perpendicular to the direction of the fluid flow F. And field polarization determines the deflection polarization of the particle.

As used herein, a force field profile of a particle defines a plurality of the deflection force settings along the direction of the fluid flow.

A first actuation inducing field can be any generated actuation inducing field, a subsequent actuation inducing field is any different actuation inducing field generated after the first actuation inducing field within the sorting electrode arrangement counter to the flow direction F.

According to an example embodiment, the actuation inducing field is an electric field. The force field profiles are electric field gradient profiles. The pulling or pushing force in the deflection force setting applied by an electric field can be defined by the amplitude and polarity thereof.

The particles can be cells, bacterium, virus, extracellular vesicles, nucleic acids, proteins etc. The particles can also be artificial encapsulates such as aqueous droplets in oil. The particle type may be determined by its chemical and/or physical and/or biological properties.

Although some embodiments may have been described with a limited number of actuators, it has to be understood that in some embodiments, even more actuators, for example more than 20, may be used to direct the particles in a gradual manner within the sorting electrode arrangement. According to some embodiments, more than 50 electrodes may be used to sort the particles.

Figure 1B:
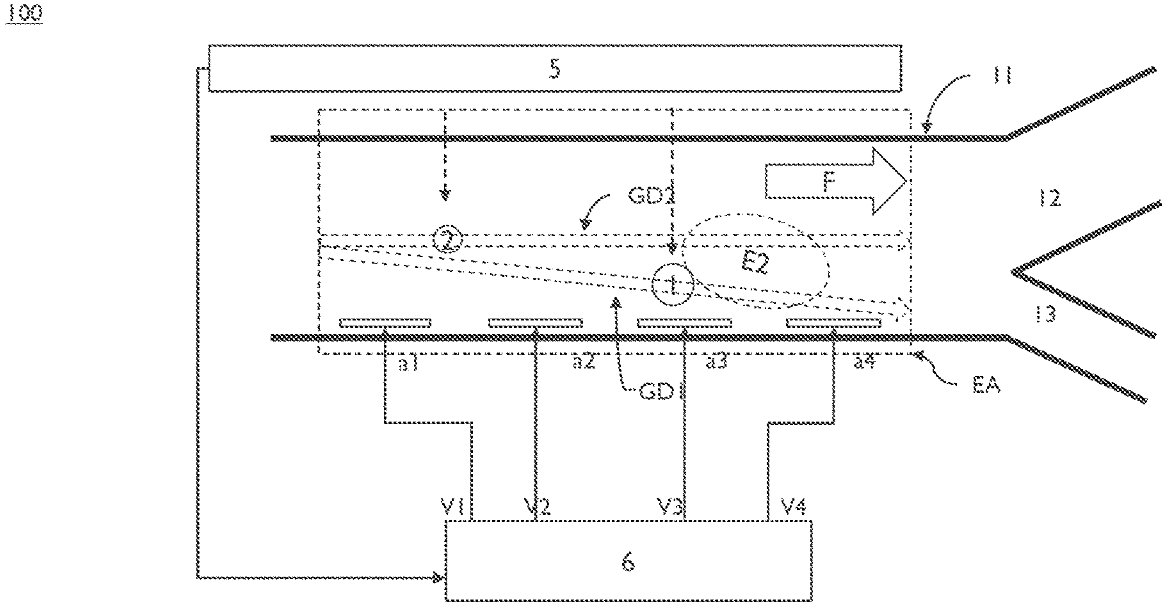

FIGS. 1*a* and 1*b* show an example of a microfluidic device 100 comprising a microfluidic channel 11, a plurality of output flow channels 12, 13 axial extending the microfluidic channel 11 in the direction of the microfluidic flow F, a first detector 5, a plurality of actuators a1 to a4 configured along the axial direction of the microfluidic channel 1 in the direction of the microfluidic flow F wherein actuators a1 to a4 are conductive pillars in and adjacent to the microfluidic channel 11. At least a first and second actuation inducing fields E1, E2 can be generated by the actuators a1 to a4 along the axial direction of the microfluidic channel 11 in the direction of the microfluidic flow F in a sorting electrode arrangement EA, a controller 6 receiving signals from the first detector 5 and controls the plurality of actuators a1 to a4 to sort particles 1, 2.

According to an example embodiment, the conductive pillars a1 to a4 are adjacent to the microfluidic channel 11 such that the distance between the conductive pillar and the adjacent microfluidic channel wall is smaller than the diameter of the smallest particle to be sorted. The particle will not be stuck between the conductive pillars and the adjacent microfluidic channel wall.

According to an example embodiment, the controller 6 detects the particle 1 and provides a first force field profile GD1. The first force field profile GD1 comprises a plurality of deflection force settings along the direction of the microfluidic flow. A first deflection force setting can be configured by a first actuation inducing field between the conductive pillar a1, a2. A second deflection force setting can be configured by a second actuation inducing field between the conductive pillar a3, a4. The first and second actuation inducing fields sort particle 1 gradually over time to the output flow channel 13 by continuously pulling the particle 1.

When a subsequent particle 2, which is physically/chemically/biologically different compared to particle 1, is detected by the first detector 5, the controller 6 provides a second force field profile GD2 to sort particle 2 gradually over time to the output flow channel 12. The second force field profile GD2 comprises a plurality of deflection force settings along the direction of the microfluidic flow. According to an example embodiment, the deflection force on particle 2 is zero in all deflection force settings in the second force field profile GD2. According to the second force field profile GD2, the first actuation inducing field between the conductive pillars a1, a2 and the second actuation inducing fields between the conductive pillars a3, a4 are zero. Without applying pulling force from the first and second actuation inducing fields, the particle 2 will follow the flow F and being sorted to the output flow channel 12 over time.

According to an example embodiment, the detector 5 may detect the location of the particles and may be able to detect differences between particles.

According to an example embodiment, deflection directions of all the deflection force settings in the same force field profile have the same polarity.

According to an example embodiment, the actuation inducing fields E1, E2 are electric fields, and the force field profiles are electric field gradient profiles.

According to an example embodiment, the force field profiles GD1, GD2 can be stored in a lookup table.

According to an example embodiment, the distance between the adjacent conductive pillars D1 can be bigger than the diameter of the particles being sorted to output flow channel 13 so that the particles can pass between the pillars.

According to an example embodiment, in operation, when particle 1 has passed a predetermined location before the actuators of the first actuation inducing field, the first actuation inducing field can be configured according to the first force field profile GD1 by configuring actuators a1, a2.

When particle 1 has passed a predetermined location between the actuators of the first actuation inducing field and the second actuation inducing field, the second actuation inducing field can be configured according to the first force field profile GD1 by configuring actuators a3, a4. When particle 2 has passed the predetermined location before the actuators of the first actuation inducing field, the actuators a1, a2 can be reconfigured to generate the first actuation inducing field according to the second force field profile GD2. In this example embodiment, the first actuation inducing field configured by actuators a1, a2 is zero. There is a period of time that both particles 1 and 2 are sorted according to different force field profile GD1 and GD2 in the sorting electrode arrangement EA.

When particle 2 has passed the predetermined location between the actuators of the first actuation inducing field and the second actuation inducing field, the actuators a3, a4 can be reconfigured to generate the second actuation inducing field according to the second force field profile GD2. In this example embodiment, the second actuation inducing field configured by actuators a3, a4 is zero.

According to an embodiment, each different force field profile is designed to sort at least one type of particle to a corresponding different output flow channel.

According to an embodiment, the plurality of actuators comprise a first conductive pillar array inside the microfluidic channel wherein the first conductive pillar array is adjacent to a first wall.

According to an embodiment, the height of conductive pillars of the conductive pillar array is at least 80% of the height of the wall. According to an embodiment, the height of conductive pillars of the first and second conductive pillar arrays is equal to the height of the wall.

Figure 2:
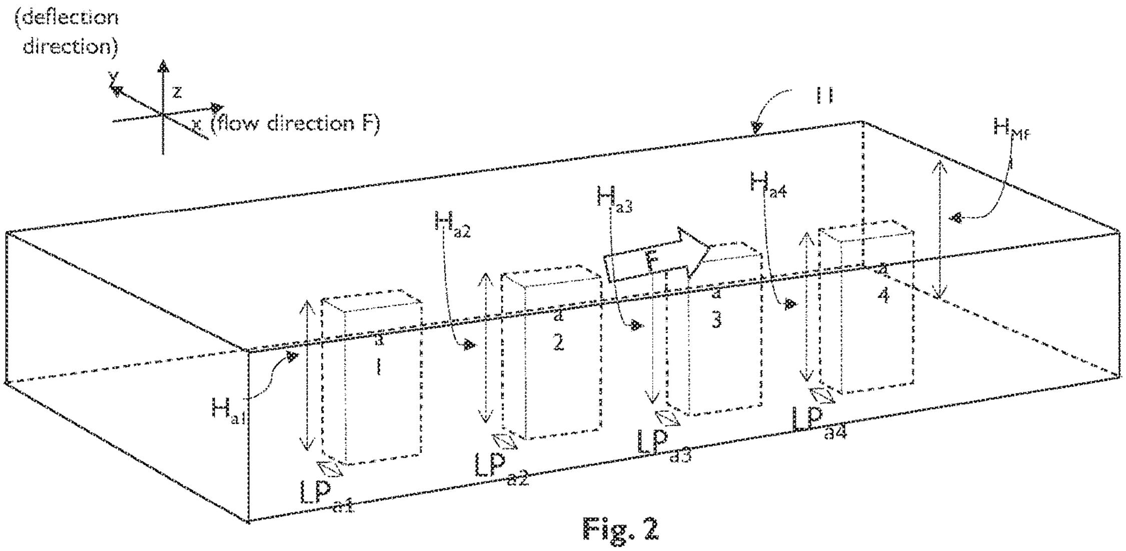
FIG. 2 shows a 3-dimensional view of the example microfluidic device of FIGS. 1*a* and 1*b* for particle sorting, according to an example embodiment.

According to an embodiment, the controller can be a general computer or field-programmable gate array (FPGA) chip. FIG. 2 shows a 3-dimensional view of the example microfluidic device in FIGS. 1*a* and 1*b*. The conductive pillars protrude from the bottom wall of the microfluidic channel 11. According to an example embodiment, the height of the conductive pillars $H_{a1}$ to $H_{a4}$ is equal to the height of the channel $H_{MF1}$. According to another example embodiment, the height of the conductive pillars $H_{a1}$ to $H_{a4}$ in the microfluidic channel 11 is shorter than the height of the channel $H_{MF1}$ wherein the particles can pass between the top of the conductive pillars and the top wall.

According to another example embodiment, the conductive pillar array a1 to a4 is adjacent to a wall wherein the distance D between each conductive pillar and the adjacent wall is:

$$D<0.5*L_{MF}-LP_{aX},$$

where aX represents the corresponding conductive pillar a1 to a4, $LP_{aX}$ represents the thickness of the conductive pillar in the axis-y.

Figure 3:
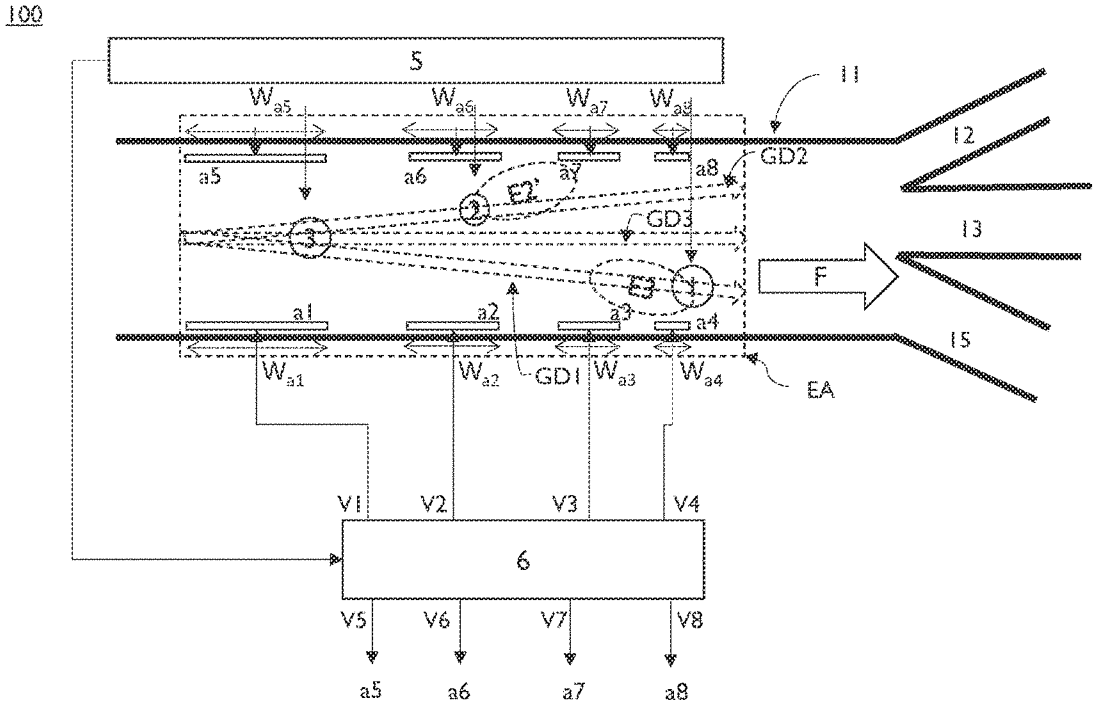
FIG. 3 shows a top view of a second example microfluidic device for particle sorting, according to an example embodiment.
Figure 4A:
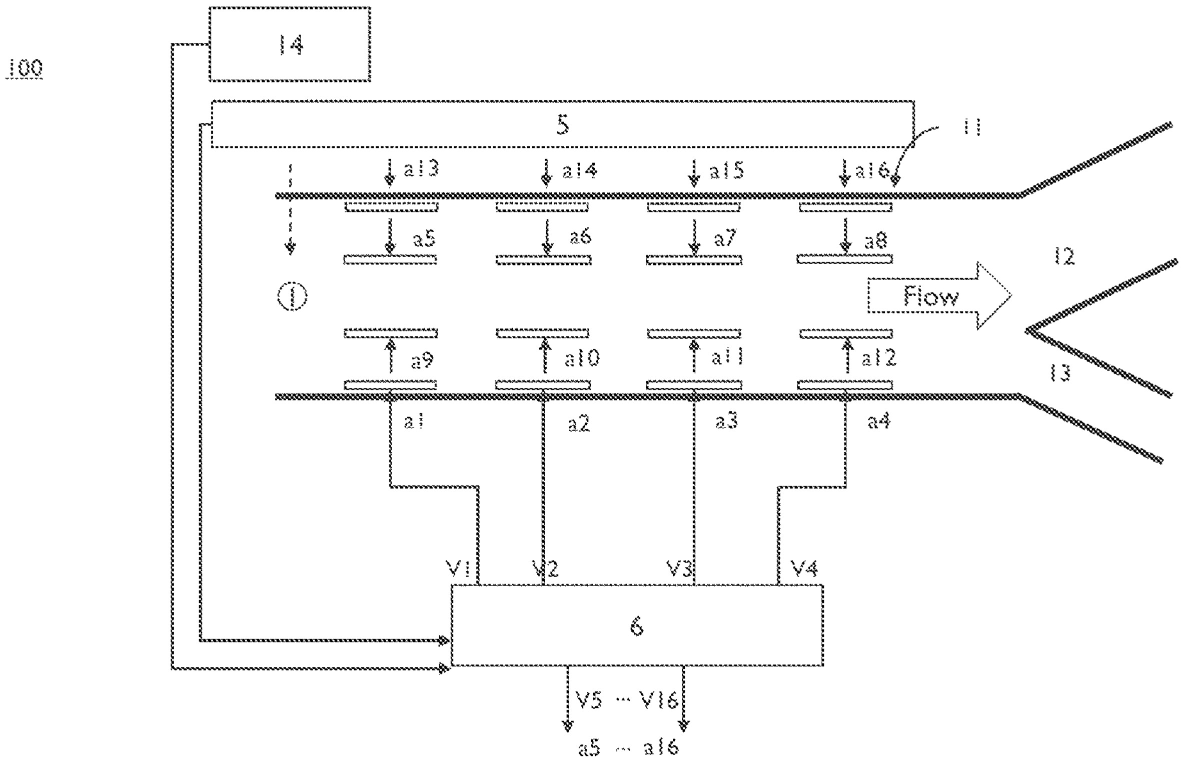
FIG. 4*a*, FIG. 4*b*, FIG. 4*c*, and FIG. 4*d* show top views of a third example microfluidic device for particle sorting, according to an example embodiment.
Figure 4B:
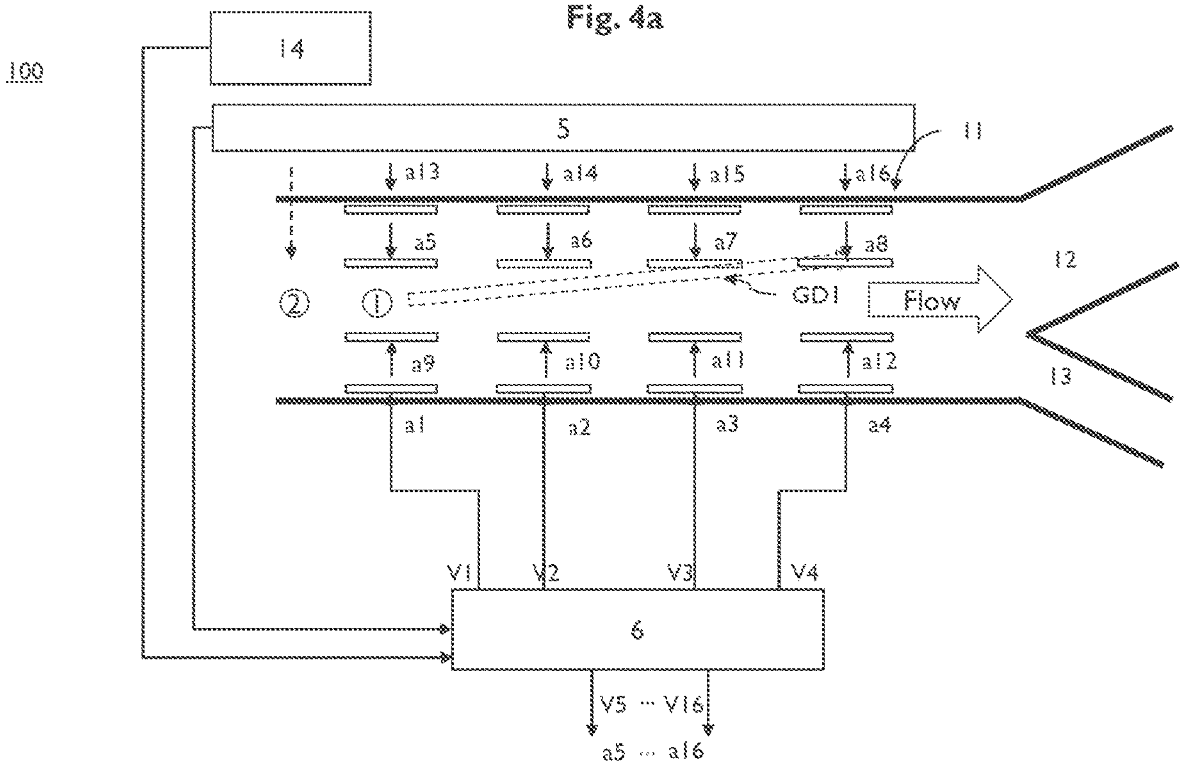
Figure 4C:
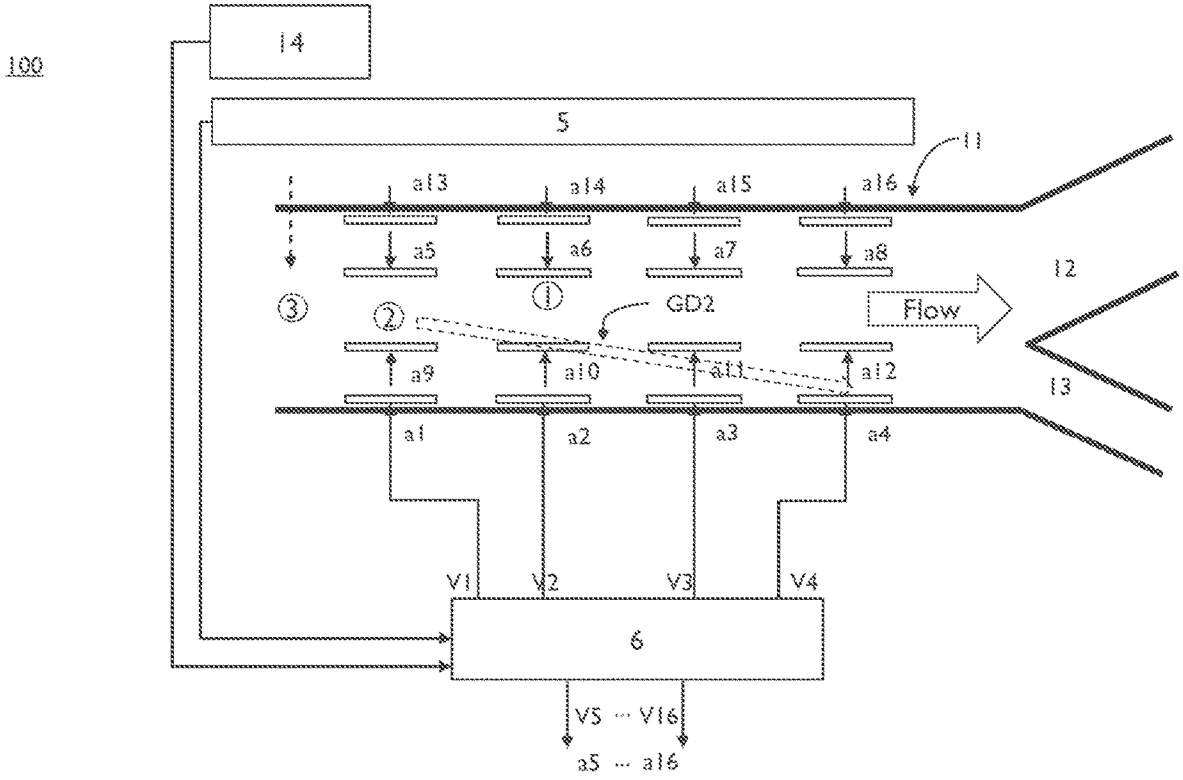
Figure 4D:
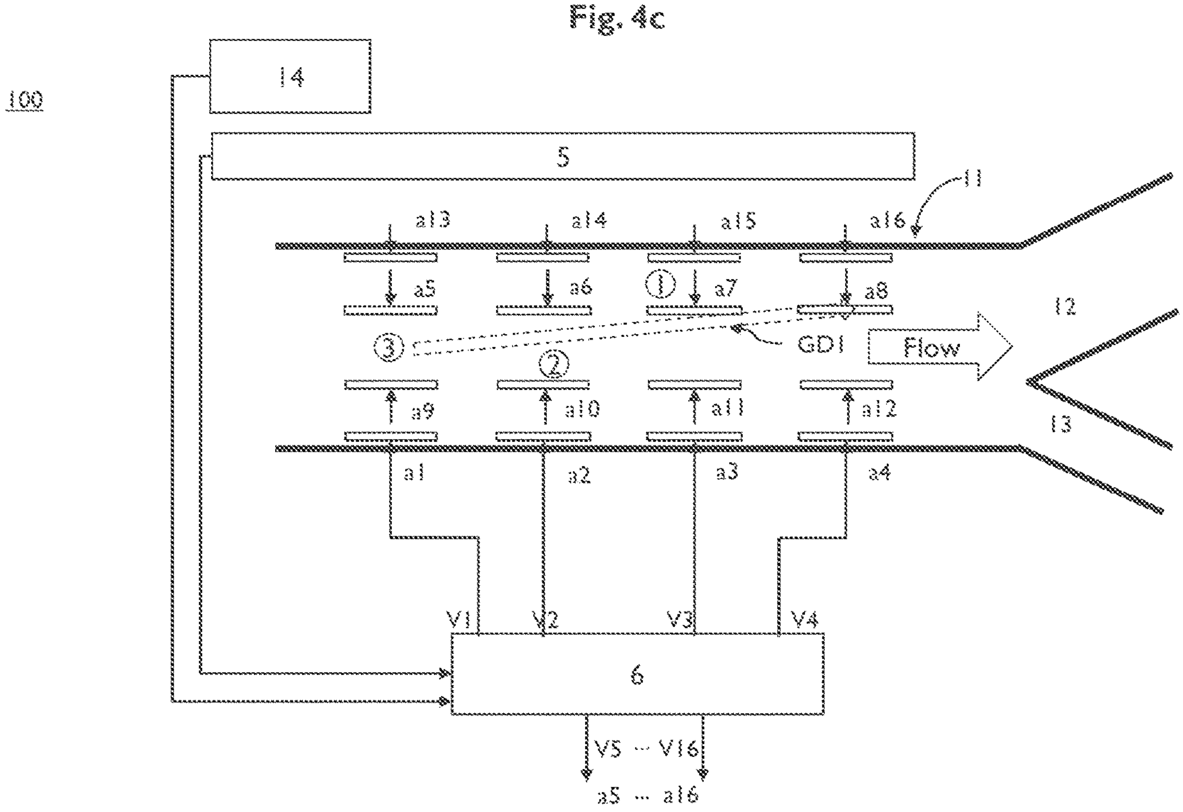
Figure 5A:
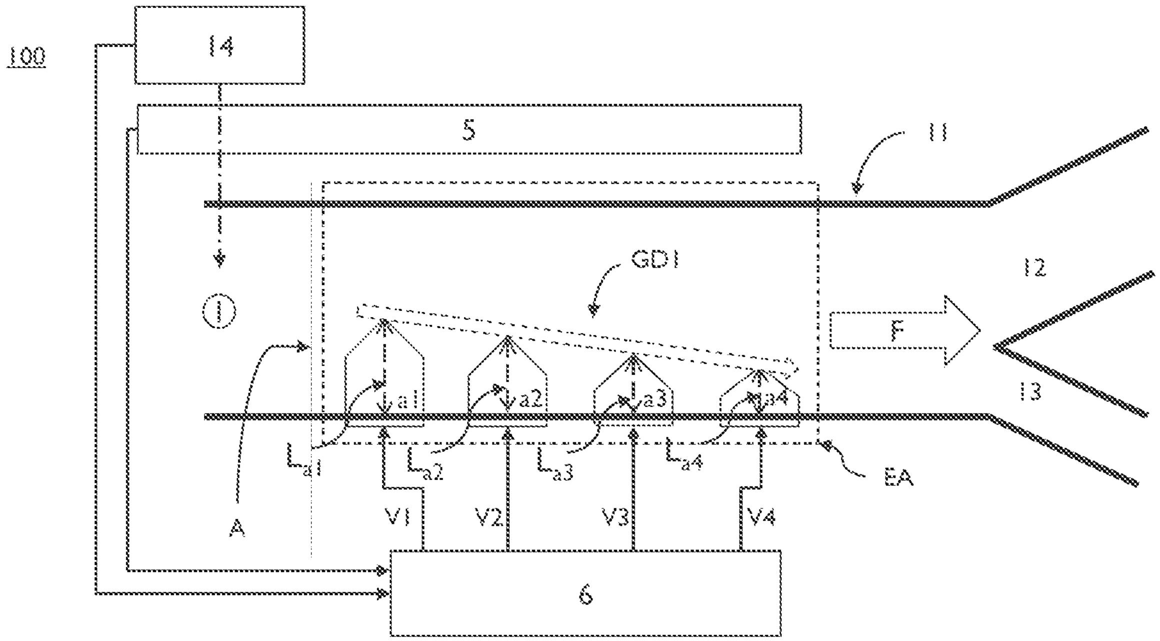
FIGS. 5*a*, FIG. 5*b*, FIG. 5*c*, FIG. 5*d*, and FIG. 5*e* show top views of a fourth example microfluidic device for particle sorting, according to an example embodiment.
Figure 5B:
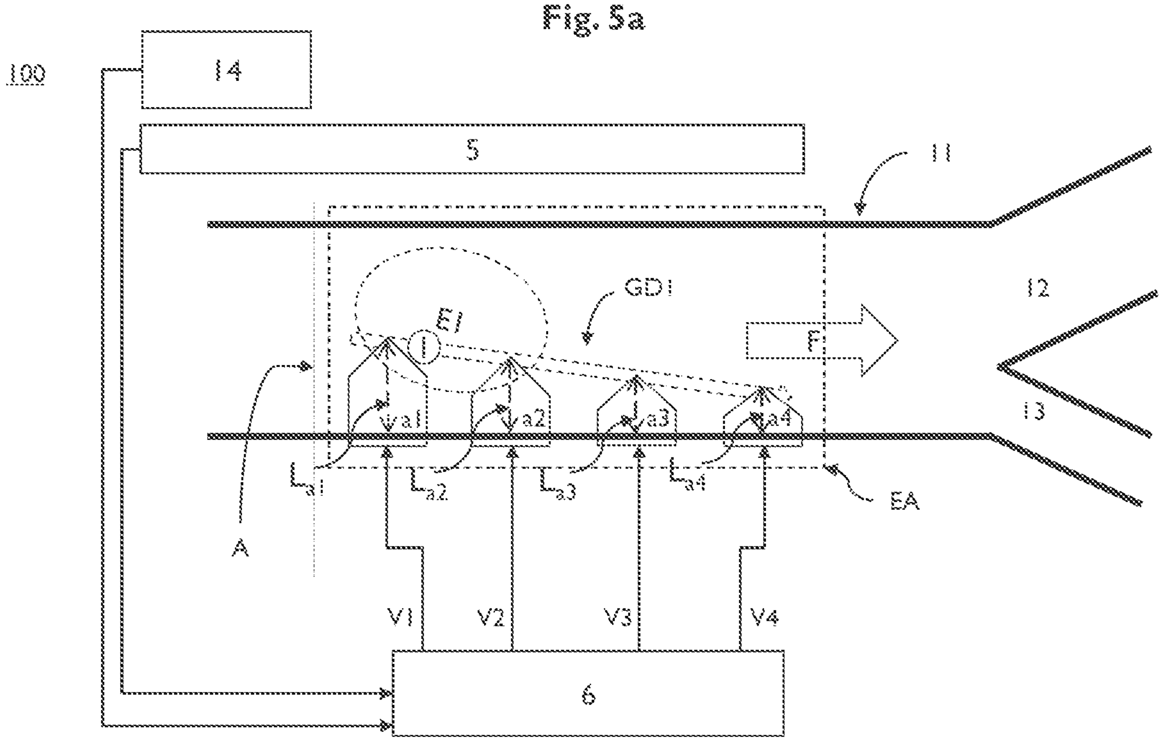
Figure 5C:
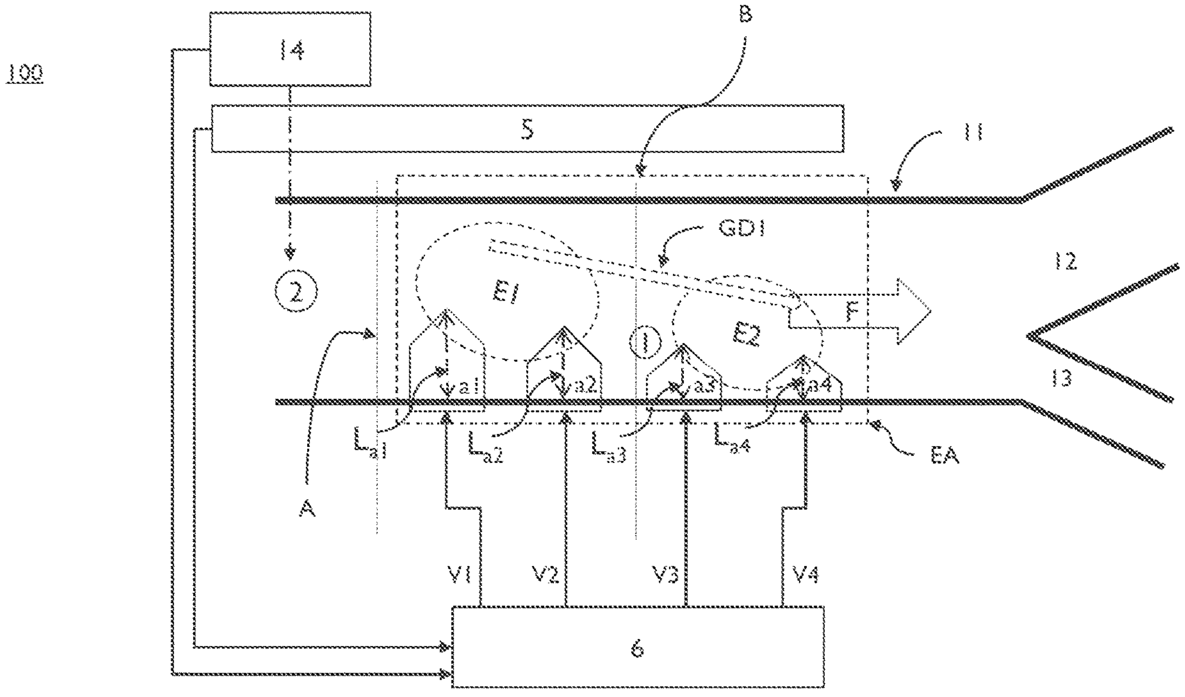
Figure 5D:
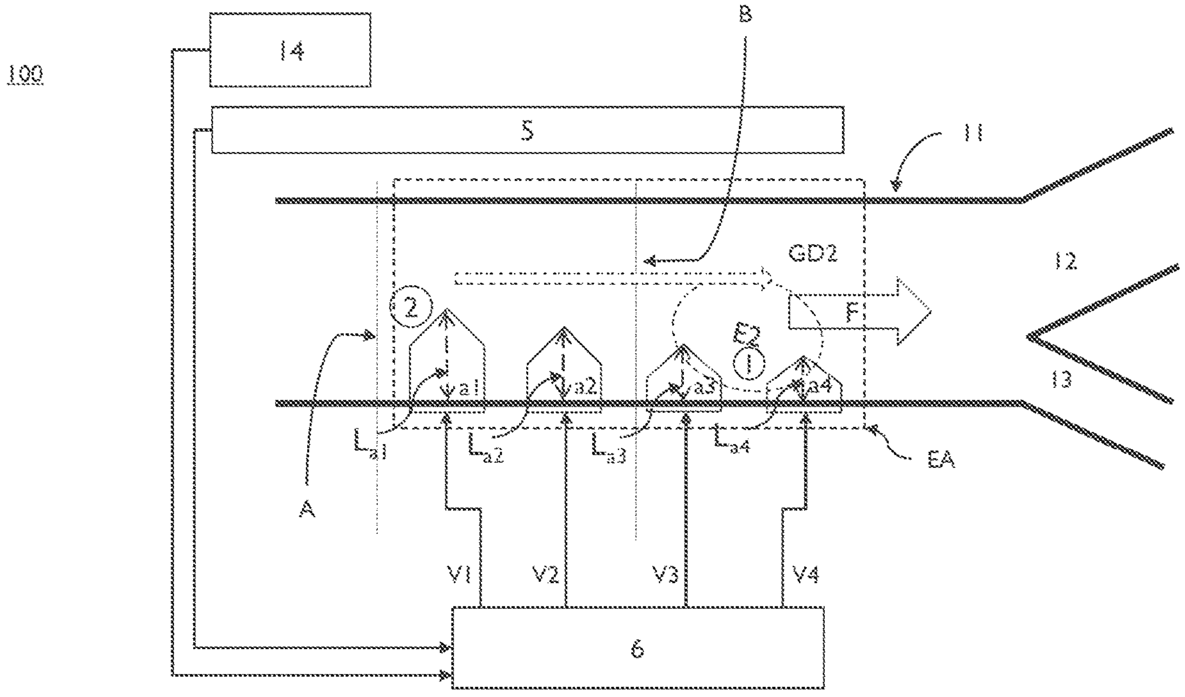
Figure 5E:
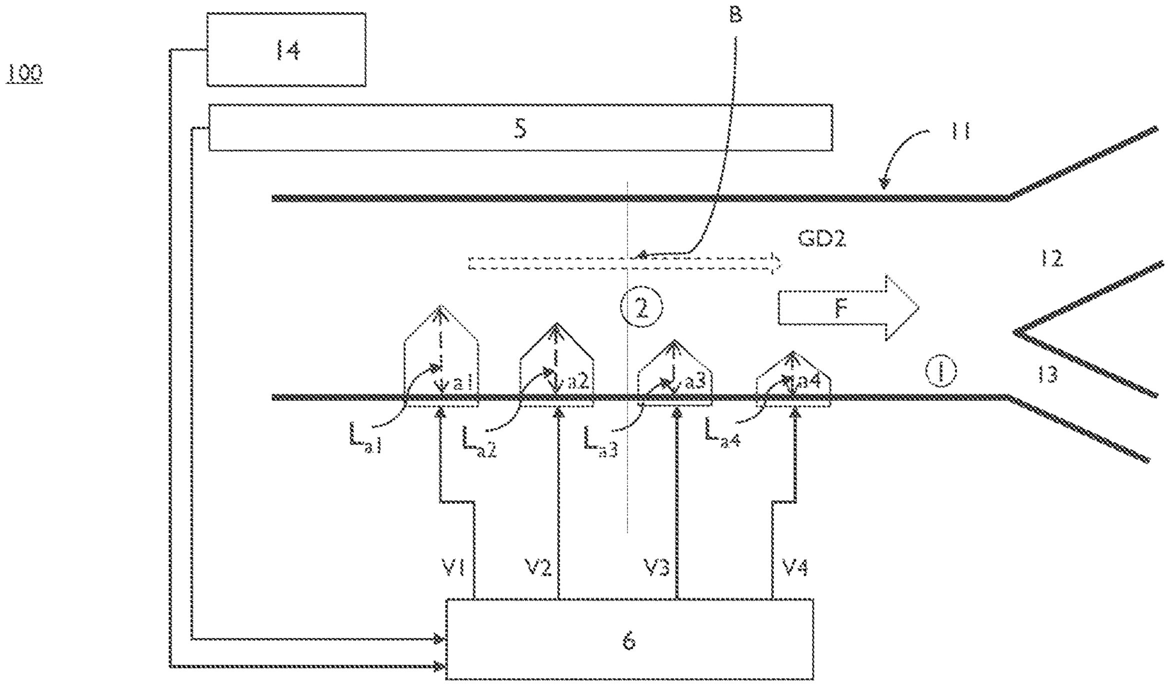

FIG. 3 shows an example of a microfluidic device 100 comprises a microfluidic channel 11, a plurality of output flow channels 12, 13 and 15 extending the microfluidic channel 11 in the direction of the microfluidic flow F, a first detector 5, a plurality of actuators a1 to a8 are configured along the axial direction of the microfluidic channel 1 in the direction of the microfluidic flow F wherein the actuators a1 to a8 can generate actuation inducing fields along the axial direction of the microfluidic channel 11 in the direction of the microfluidic flow F in a sorting electrode arrangement EA, a controller 6 receiving signals from the first detector 5 and controls the plurality of actuators a1-a8 for sorting particles 1, 2 and 3.

Example Scenario 1

According to an example embodiment, the controller 6 detects the particle 1 and provides a first force field profile GD1. The first force field profile GD1 comprises a plurality of deflection force settings along the direction of the microfluidic flow. A first deflection force setting can be configured by a first actuation inducing field. The first actuation inducing field can be configured by an actuation inducing field between the conductive pillar a1, a2 and/or an actuation inducing field between the conductive pillar a5, a6. A second deflection force setting can be configured by a second actuation inducing field. The second actuation inducing field can be configured by an actuation inducing field between the conductive pillar a2, a3 and/or an actuation inducing field between the conductive pillar a6, a7 is A third deflection force setting can be configured by a third actuation inducing field. The third actuation inducing field can be configured by an actuation inducing field between the conductive pillar a3, a4 and/or an actuation inducing field between the conductive pillar a7, a8. The actuation inducing fields between the conductive pillar a1, a2 and/or a2, a3 and/or a3, a4 pulls the particle 1. According to an example embodiment, the actuation inducing fields between the conductive pillar a5, a6 and/or a6, a7 and/or a7, a8 are zero. According to another example embodiment, the actuation inducing fields between the conductive pillar a5, a6 and/or a6, a7 and/or a7, a8 pushes the particle 1. The first, second and third actuation inducing fields are configured to sort particle 1 gradually over time to the output flow channel 15 by continuously pulling the particle 1 wherein the deflection directions of deflection force applied to the first particle 1 by the first, second and third actuation inducing fields have the same polarity.

When a subsequent particle 2, which is physically/chemically different compared to particle 1, is detected by the first detector 5, the controller 6 provides a second force field profile GD2. The first force field profile GD1 comprises a plurality of deflection force settings along the direction of the microfluidic flow F. A first deflection force setting can be configured by a first actuation inducing field. The first actuation inducing field can be configured by an actuation inducing field between the conductive pillar a5, a6 and/or an actuation inducing field between the conductive pillar a1, a2. A second deflection force setting can be configured by a second actuation inducing field. The second actuation inducing field can be configured by an actuation inducing field between the conductive pillar a6, a7 and/or an actuation inducing field between the conductive pillar a2, a3. A third deflection force setting can be configured by a third actuation inducing field. The third actuation inducing field can be configured by an actuation inducing field between the conductive pillar a7, a8 and/or an actuation inducing field between the conductive pillar a3, a4. The actuation inducing fields between the conductive pillar a5, a6 and/or a6, a7 and/or a7, a8 pulls the particle 2. According to an example embodiment, the actuation inducing fields between the conductive pillar a1, a2 and/or a2, a3 and/or a3, a4 are zero. According to another example embodiment, the actuation inducing fields between the conductive pillar a1, a2 and/or a2, a3 and/or a3, a4 pushes the particle 2. The first, second and third actuation inducing fields sort particle 2 gradually over time to the output flow channel 12 by continuously pulling the particle 2.

When a subsequent particle 3, which is physically/chemically/biologically different compared to particle 1 and 2, is detected by the first detector 5, the controller 6 provides a third force field profile GD3 to sort particle 3 gradually over time to the output flow channel 13. The third force field profile GD3 comprises a plurality of deflection force settings along the direction of the microfluidic flow. According to an example embodiment, the deflection force on particle 3 is zero in all deflection force settings in the third force field profile GD3. According to the third force field profile GD3, the first, second and third actuation inducing fields are zero. Without applying pulling force from the first and second actuation inducing fields, the particle 3 will follow the flow F and being sorted to the output flow channel 13 over time.

According to an example embodiment, in operation, particle 1 is detected by the first detector 5 and a signal is coupled to the controller 6. The controller 6 provides the first force field profile GD1. When the location of particle 1 has passed a predetermined location before the actuators a1, a2 of the first actuation inducing field, the first actuation inducing field can be configured between actuators a1, a2 according to the first force field profile GD1. When particle 1 has passed a predetermined location between the actuators of the first and second actuation inducing fields, the second actuation inducing field between the actuators a2, a3 can be configured according to the first force field profile GD1. In this example, the predetermined location between the actuators of the first and second actuation inducing fields is a xy-plane between actuators a2, a6. When particle 2 has passed the predetermined location before the actuators of the first actuation inducing field, the first actuation inducing field can be reconfigured by generating an actuation inducing field between actuators a5, a6 and reset actuation inducing field between the actuators a1, a2 according to the second force field profile GD2. When particle 1 has passed a predetermined location between the actuators of the second actuation inducing field and the third actuation inducing field, the third actuation inducing field E3 can be configured according to the first force field profile GD1 by configuring actuators a3, a4. In this example, the predetermined location between the actuators of the first and second actuation inducing fields is a xy-plane between actuators a3, a7. When particle 2 has passed the predetermined location between the actuators of the first actuation inducing field and the second actuation inducing field, the second actuation inducing field can be reconfigured by generating an actuation inducing field E2' between actuators a6, a7 and reset actuation inducing field between the actuators a2, a3 according to the second force field profile GD2. When particle 3 has passed the predetermined location before the actuators of the first actuation inducing field, the first actuation inducing field can be reconfigured by resetting the actuation inducing field between actuators a5, a6 according to the third force field profile GD3. When particle 2 has passed the predetermined location between the actuators of the second actuation inducing field and the third actuation inducing field, the third actuation inducing field can be reconfigured by generating an actuation inducing field between actuators a7, a8 and reset the actuation inducing field between the actuators a3, a4 according to the second force field profile GD2. When particle 3 has passed the predetermined location between the actuators of the first actuation inducing field and the second actuation inducing field, the second actuation inducing field can be reconfigured by resetting the actuation inducing field between the actuators a6, a7 according to the third force field profile GD3. When particle 3 has passed the predetermined location between the actuators of the second actuation inducing field and the third actuation inducing field, the third actuation inducing field can be reconfigured by resetting the actuation inducing field between the actuators a7, a8 according to the third force field profile GD3.

Example Scenario 2

According to an example embodiment, the controller 6 detects the particle 1 and provides a first force field profile GD1. The first force field profile GD1 comprises a plurality of deflection force settings along the direction of the microfluidic flow. A first deflection force setting can be configured by a first actuation inducing field. The first actuation inducing field can be configured by an actuation inducing field between the conductive pillar a1, a5. A second deflection force setting can be configured by a second actuation inducing field between the conductive pillar a2, a6. A third deflection force setting can be configured by a third actuation inducing field by an actuation inducing field between the conductive pillar a3, a7. A fourth deflection force setting can be configured by a third actuation inducing field by an actuation inducing field between the conductive pillar a4, a8. The first, second, third and fourth actuation inducing fields are configured to sort particle 1 gradually over time to the output flow channel 15 by continuously pulling the particle 1 wherein the deflection directions of deflection force applied to the first particle 1 by the first, second, third and fourth actuation inducing fields have the same polarity.

When a subsequent particle 2, which is physically/chemically different compared to particle 1, is detected by the first detector 5, the controller 6 provides a second force field profile GD2. The first force field profile GD2 comprises a plurality of deflection force settings along the direction of the microfluidic flow. A first deflection force setting can be configured by a first actuation inducing field. The first actuation inducing field can be configured by an actuation inducing field between the conductive pillar a1, a5. A second deflection force setting can be configured by a second actuation inducing field between the conductive pillar a2, a6. A third deflection force setting can be configured by a third actuation inducing field by an actuation inducing field between the conductive pillar a3, a7. A fourth deflection force setting can be configured by a third actuation inducing field by an actuation inducing field between the conductive pillar a4, a8. The first, second, third and fourth actuation inducing fields are configured to sort particle 2 gradually over time to the output flow channel 12 by continuously pulling the particle 2 wherein the deflection directions of deflection force applied to the first particle 2 by the first, second, third and fourth actuation inducing fields have the same polarity.

When a subsequent particle 3, which is physically/chemically/biologically different compared to particle 1 and 2, is detected by the first detector 5, the controller 6 provides a third force field profile GD3 to sort particle 3 gradually over time to the output flow channel 13. The third force field profile GD3 comprises a plurality of deflection force settings along the direction of the microfluidic flow. According to an example embodiment, the deflection force on particle 3 is zero in all deflection force settings in the third force field profile GD3. According to the third force field profile GD3, the first, second, third and fourth actuation inducing fields are zero. Without applying pulling force from the first and second actuation inducing fields, the particle 3 will follow the flow F and being sorted to the output flow channel 13 over time.

According to an example embodiment, in operation, particle 1 is detected by the first detector 5 and a signal is coupled to the controller 6. The controller 6 provides the first force field profile GD1. When the location of particle 1 has passed a predetermined location before the actuators a1, a5 of the first actuation inducing field, the first actuation inducing field can be configured between actuators a1, a5 according to the first force field profile GD1. When particle 1 has passed a predetermined location between the actuators of the first and second actuation inducing fields, the second actuation inducing field between the actuators a2, a6 can be configured according to the first force field profile GD1. When particle 2 has passed the predetermined location before the actuators of the first actuation inducing field, the first actuation inducing field can be reconfigured by generating an actuation inducing field between actuators a1, a5 according to the second force field profile GD2. When particle 1 has passed a predetermined location between the actuators of the second actuation inducing field and the third actuation inducing field, the third actuation inducing field can be configured according to the first force field profile GD1 by configuring actuators a3, a7. When particle 2 has passed the predetermined location between the actuators of the first actuation inducing field and the second actuation inducing field, the second actuation inducing field can be reconfigured by generating an actuation inducing field between actuators a2, a6 according to the second force field profile GD2. When particle 3 has passed the predetermined location before the actuators of the first actuation inducing field, the first actuation inducing field can be reconfigured by resetting the actuation inducing field between actuators a1, a5 according to the third force field profile GD3. When particle 1 has passed a predetermined location between the actuators of the third actuation inducing field and the fourth actuation inducing field, the fourth actuation inducing field can be configured according to the first force field profile GD1 by configuring actuators a4, a8. When particle 2 has passed the predetermined location between the actuators of the second actuation inducing field and the third actuation inducing field, the third actuation inducing field can be reconfigured by generating an actuation inducing field between actuators a3, a7 according to the second force field profile GD2. When particle 3 has passed the predetermined location between the actuators of the first actuation inducing field and the second actuation inducing field, the second actuation inducing field can be reconfigured by resetting the actuation inducing field between the actuators a2, a6 according to the third force field profile GD3. When particle 2 has passed a predetermined location between the actuators of the third actuation inducing field and the fourth actuation inducing field, the fourth actuation inducing field can be configured according to the first force field profile GD2 by configuring actuators a4, a8. When particle 3 has passed the predetermined location between the actuators of the second actuation inducing field and the third actuation inducing field, the third actuation inducing field can be reconfigured by resetting the actuation inducing field between the actuators a3, a7 according to the third force field profile GD3. When particle 3 has passed a predetermined location between the actuators of the third actuation inducing field and the fourth actuation inducing field, the fourth actuation inducing field can be configured according to the first force field profile GD3 by configuring actuators a4, a8.

According to an example embodiment, the width of the actuators of the subsequent actuation inducing field in the direction of the flow F is equal to or shorter than the actuators of the previous actuation inducing field, e.g. $W_{a3}<W_{a1}$.

According to an embodiment, the plurality of actuators comprises a second conductive pillar array inside the microfluidic channel wherein the second conductive pillar array is adjacent to a second wall opposed to the first wall.

FIGS. 4*a*-4*d* shows an example of a microfluidic device 100 comprises a microfluidic channel 11, a plurality of output flow channels 12, 13 axial extending the microfluidic channel 11 in the direction of the microfluidic flow F, first and second detectors 5, 14, a plurality of actuators a1 to a16 are configured along the axial direction of the microfluidic channel 11 in the direction of the microfluidic flow F wherein the actuators a1 to a16 are conductive pillars in a sorting electrode arrangement EA in the microfluidic channel 11. The actuators a1 to a16 can configure a plurality of actuation inducing fields along the axial direction of the microfluidic channel 11 in the direction of the microfluidic flow F, a controller 6 receiving signals from the first and second detectors 5, 14 and controls the plurality of actuators a1-a16 and particles 1 to 3.

According to an example embodiment, the second detector 14 can detect the difference between the particles and can further classify the particles based on the detected at least one differences between particles.

According to an example embodiment, when particle 1 is detected and classified by the second detector 14 and a signal is coupled to the controller 6. The controller 6 determines a first force field profile GD1 for particle 1 to sort particle 1 gradually over time to the output flow channel 12.

When a subsequent particle 2, which is physically/chemically/biologically different compared to particle 1, is detected and classified by the first detector 5, the controller 6 determines a second force field profile GD2 to sort particle 2 gradually over time to the output flow channel 13.

When a subsequent particle 3, which is physically/chemically/biologically different compared to particle 2, is detected and classified by the first detector 5, the controller 6 determines a second force field profile GD3 to sort particle 3 gradually over time to the output flow channel 12.

According to an example embodiment, the particle 3 can be physically/chemically/biologically identical to particle 1. According to another example embodiment, the particle 3 can be physically/chemically/biologically different to particle 1.

Each of the force field profiles GD1 to GD3 comprises a first actuation inducing field can be configured by actuators a1, a5, a9, a13, a second actuation inducing field can be configured by actuators a2, a6, a10, a14, a third actuation inducing field can be configured by actuators a3, a7, a11, a15 and a fourth actuation inducing field can be configured by actuators a4, a8, a12, a16. The first to fourth actuation inducing fields sort each particle gradually over time to the output flow channel 12 or 13 by continuously pulling the particle wherein the deflection directions of deflection force applied to each particle by the first, second, third and fourth actuation inducing fields have the same polarity.

According to an example embodiment, in operation, particle 1 is detected by the first and second detectors 5, 14 and a signal is coupled to the controller 6. The controller 6 determines the first force field profile GD1. When the location of particle 1 has passed a predetermined location before the actuators a1, a5, a9, a13 of the first actuation inducing field, the first actuation inducing field can be configured according to the first force field profile GD1 by configuring actuators a5, a9. When particle 1 has passed a predetermined location between the actuators of the first actuation inducing field and the second actuation inducing field, the second actuation inducing field can be configured according to the first force field profile GD1 by configuring actuators a6, a10. When particle 2 has passed the predetermined location before the actuators of the first actuation inducing field, the first actuation inducing field can be reconfigured by generating an actuation inducing field between actuators a5, a9 according to the second force field profile GD2. When particle 1 has passed a predetermined location between the actuators of the second actuation inducing field and the third actuation inducing field, the third actuation inducing field can be configured according to the first force field profile GD1 by configuring actuators a7 and a15. When particle 2 has passed the predetermined location between the actuators of the first actuation inducing field and the second actuation inducing field, the second actuation inducing field can be reconfigured by generating an actuation inducing field between actuators a6, a10 according to the second force field profile GD2. When particle 3 has passed the predetermined location before the actuators of the first actuation inducing field, the first actuation inducing field can be reconfigured by resetting the actuation inducing field between actuators a5, a9 to zero according to the third force field profile GD3. When particle 1 has passed a predetermined location between the actuators of the third actuation inducing field and the fourth actuation inducing field, the fourth actuation inducing field can be configured according to the first force field profile GD1 by configuring an actuation inducing field between actuators a8, a16. When particle 2 has passed the predetermined location between the actuators of the second actuation inducing field and the third actuation inducing field, the third actuation inducing field can be reconfigured by generating an actuation inducing field between actuators a3, a11 according to the second force field profile GD2. When particle 3 has passed the predetermined location between the actuators of the first actuation inducing field and the second actuation inducing field, the second actuation inducing field can be reconfigured by resetting the actuation inducing field between the actuators a6, a10 to zero according to the third force field profile GD3. When particle 2 has passed the predetermined location between the actuators of the third actuation inducing field and the fourth actuation inducing field, the fourth actuation inducing field can be reconfigured by generating an actuation inducing field between actuators a4, a12 according to the second force field profile GD2. When particle 3 has passed the predetermined location between the actuators of the second actuation inducing field and the third actuation inducing field, the third actuation inducing field can be reconfigured by resetting the actuation inducing field between the actuators a7, a15 and a3, a11 to zero according to the third force field profile GD3. When particle 3 has passed the predetermined location between the actuators of the third actuation inducing field and the fourth actuation inducing field, the fourth actuation inducing field can be reconfigured by resetting the actuation inducing field between the actuators a8, a16 and a4, a12 to zero according to the third force field profile GD3.

According to an example embodiment, the microfluidic device 100 comprises more than 16 actuators. According to an example embodiment, the actuators in the microfluidic device 100 are all conductive pillars in the microfluidic channel 11. According to an example embodiment, the conductive pillars are electrode protrusions whereas the particles can pass over the electrode protrusions.

According to another example embodiment, the distance between each conductive pillar and the adjacent wall is larger than the diameter of at least one type of the particle so that the particle can flow between the conductive pillar and the adjacent wall.

According to an embodiment, the height of conductive pillars of the conductive pillar array is at least 80% of the height of the wall. According to an embodiment, the height of conductive pillars of the first and second conductive pillar arrays is equal to the height of the wall.

FIGS. 5*a* to 5*e* shows an example of a microfluidic device 100 comprises a microfluidic channel 11, a plurality of output flow channels 12, 13 axial extending the microfluidic channel 11 in the direction of the microfluidic flow F, a first and second detectors 5, 14, a plurality of actuators a1 to a4 are configured along the axial direction of the microfluidic channel 11 in the direction of the microfluidic flow F wherein at least a first and second actuation inducing fields E1, E2 can be generated by the actuators along the axial direction of the microfluidic channel 11 in the direction of the microfluidic flow F in a sorting electrode arrangement EA, a controller 6 receiving signals from the first and second detectors 5, 14 and controls the plurality of actuators a1 to a4. A plurality of particles 1 and 2 are sorted according to a first and second force field profiles GD1, GD2. A predetermined first location A is defined prior to the sorting electrode arrangement EA. A predetermined second location B is defined between the first actuation inducing field E1 and the second actuation inducing field E2.

According to an example embodiment, in operation, the particle 1, 2 are sorted in a similar manner in the example shown in FIG. 1*a*, 1*b*.

According to an example embodiment, the length of the actuators configuring the subsequent actuation inducing field E2 is shorter than the length of the actuators configuring the first actuation inducing field E1 along the counter direction of the flow direction F, e.g., in FIG. 1*a* to 1*e*, $L_{a1}>L_{a3}$, $L_{a1}>L_{a4}$, $L_{a2}>L_{a3}$, $L_{a2}>L_{a4}$. According to an example embodiment, the length of the actuators is the same in the same actuation inducing field, e.g., $L_{a1}=L_{a2}$ and/or $L_{a3}=L_{a4}$. According to another example embodiment, the length of the subsequent actuator is shorter than the previous actuators of the same actuation inducing field along the counter direction of the flow direction F, meaning $L_{a1}>L_{a2}$ and/or $L_{a3}>L_{a4}$.

According to an example embodiment, each of the deflection force settings of the force field profile is the same wherein the gradual change of the length of the actuators in the direction of the flow F leads to the gradual pulling of the particle 1 towards output flow channel 13.

According to another example embodiment, the maximum force of the deflection force settings of the force field profile gradually decrease along the direction of the flow F. The gentle pulling force applied on, for example particle 1, prevents damage of particle 1.

According to an embodiment, the plurality of actuators comprise a first actuator array located on a first side of a wall and a second actuator array located on a second side of the same wall, wherein the length of each actuator of the first actuator array is shorter than half of the width of the wall.

According to an embodiment, the width of the actuators used for generating the subsequent actuation inducing field is equal to or shorter than the width of the actuators used for generating the first actuation inducing field.

Figure 6:
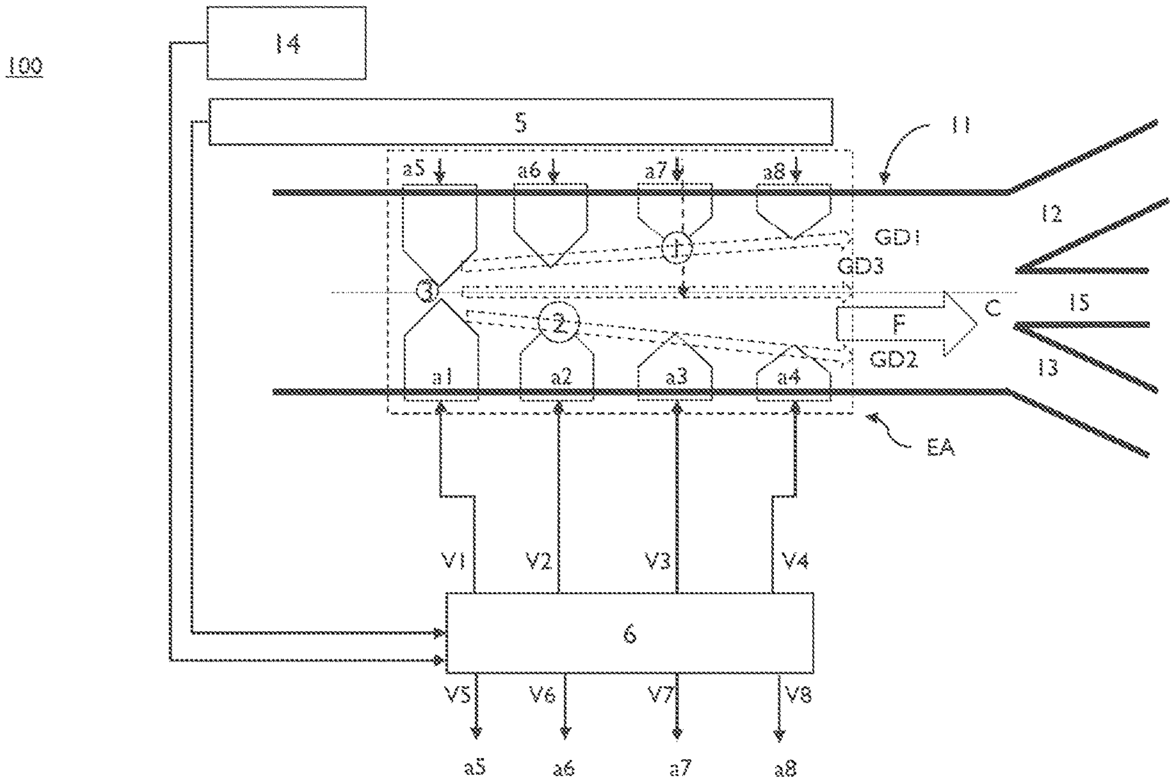
FIG. 6 shows a top view of a fifth example microfluidic device for particle sorting.

FIG. 6 shows an example of a microfluidic device 100 comprises a microfluidic channel 11, a plurality of output flow channels 12, 13 and 15 axial extending the microfluidic channel 11 in the direction of the microfluidic flow F, first and second detectors 5, 14, a plurality of actuators a1 to a8 are configured along the axial direction of the microfluidic channel 1 in the direction of the microfluidic flow F wherein the actuators can create at least a first and second actuation inducing fields along the axial direction of the microfluidic channel 11 in the direction of the microfluidic flow F in a sorting electrode arrangement EA, a controller 6 receiving signals from the first and second detectors 5, 14 and controls the plurality of actuators a1 to a8 and plurality of particles 1, 2 and 3 accordingly with force field profiles GD1, GD2 and GD3.

According to an example embodiment, in operation, the particles 1, 2 and 3 are sorted in a similar manner in FIG. 3.

FIGS. 7*a* to 7*d* shows 3-dimensional views of examples of different arrangement of the actuators located on the walls of the microfluidic device.

According to an example embodiment, as shown in FIG. 7*a*, the deflection direction can be on the axis-z.

The predetermined locations, such as the predetermined first and second locations as shown in FIG. 7*b*, are a location on the plane A or B in the yz-plane.

A wall central axis C can be the Median line of a wall where the actuators a1 to a8 locate in view of the width of the wall $L_{MF1}$ as shown in FIG. 7*c*.

According to an example embodiment, as shown in FIG. 7*c*, the actuators a1 to a8 are in an electrode layer at bottom wall of the microfluidic channel 11. The length $L_{a1}$-$L_{a8}$ of the actuators a1 to a8 are shorter than half of the bottom wall width $L_{MF1}$.

Figure 7D:
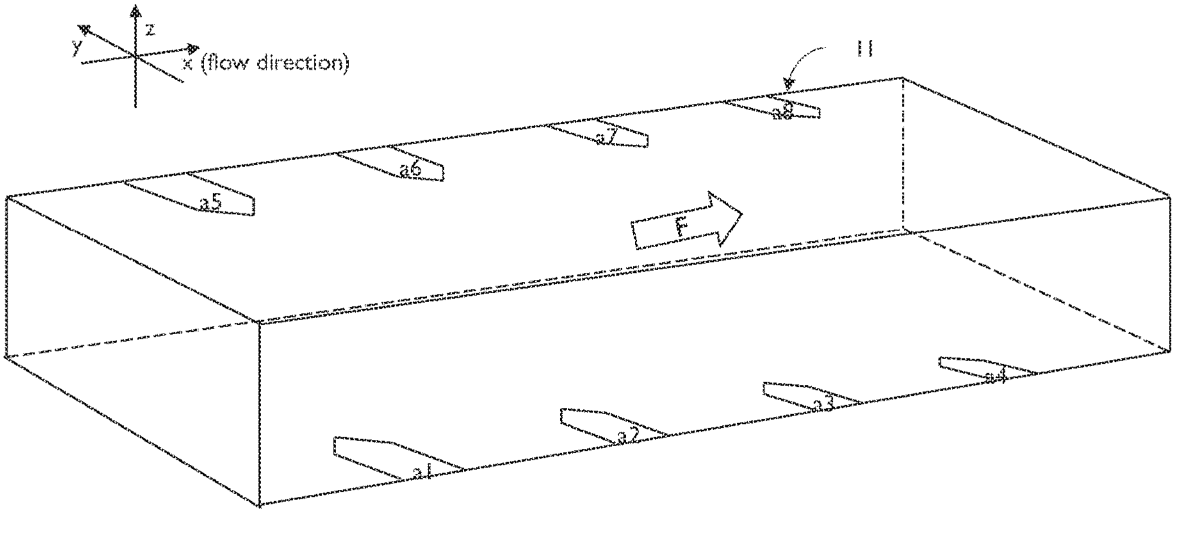

According to an example embodiment, as shown in FIG. 7*d*, the actuators a1-a8 are electrode layer at different walls of the microfluidic channel 11. According to an example embodiment, the actuators a1-a4 locate on the bottom wall and the actuators a5-a8 locate on the top wall. The length $L_{a1}$-$L_{a8}$ of the actuators a1-a8 are shorter than half of the bottom or top wall width $L_{MF1}$.

What is claimed is:

1. A microfluidic device for sorting particles comprising:

a microfluidic channel configured to receive a microfluidic flow that comprises a plurality of particles having different characteristics, wherein the microfluidic channel has a plurality of output flow channels;

a first detector configured to detect the location of the particles;

a plurality of actuators located along the direction of the microfluidic flow and defining a sorting electrode arrangement, wherein the plurality of actuators comprise a first conductive pillar array inside the microfluidic channel; and a controller configured to receive signals from the first detector and to provide force field profiles for each of the plurality of particles, wherein each force field profile comprises a plurality of deflection force settings along the direction of the microfluidic flow, wherein the controller is additionally configured to, based on the provided force field profiles, individually address each conductive pillar within the plurality of actuators to generate a plurality of actuation inducing fields along the direction of the microfluidic flow, wherein the actuation inducing fields are configured to generate the deflection force settings in the force field profiles, wherein the plurality of the force field profiles are different for each different particle and are provided to direct each particle in a gradual manner within the sorting electrode arrangement, and wherein the controller is additionally configured to gradually direct at least two different particles simultaneously within the sorting electrode arrangement.

2. The microfluidic device of claim 1, wherein deflection directions of all the deflection force settings in the same force field profile have the same polarity.

3. The microfluidic device of claim 1, further comprising a second detector, wherein the controller is additionally configured to use the second detector to determine the force field profiles for each of the plurality of particles.

4. The microfluidic device of claim 1, wherein the actuation inducing fields are dielectrophoretic electric fields, and wherein the force field profiles are electric field gradient profiles.

5. The microfluidic device of claim 4, wherein the controller is configured to direct at least a first particle according to a first force field profile and to direct a second particle according to a second force field profile, wherein each force field profile comprises a first deflection force setting and a second deflection force setting, wherein the controller simultaneously generates the first deflection force setting by a first actuation inducing field according to the second force field profile for the second particle and the second deflection force setting by a second actuation inducing field according to the first force field profile for the first particle, and wherein the controller is configured to individually and dynamically adjust the plurality of actuation inducing fields based on the location of the first and second particle.

6. The microfluidic device of claim 1, wherein the first conductive pillar array is adjacent to a first wall.

7. The microfluidic device of claim 6, wherein the plurality of actuators comprise a second conductive pillar array inside the microfluidic channel, and wherein the second conductive pillar array is adjacent to a second wall opposed to the first wall.

8. The microfluidic device of claim 7, wherein a height of conductive pillars of the first and second conductive pillar arrays is at least 80% of a height of the wall.

9. The microfluidic device of claim 1, wherein the plurality of actuators comprise a first actuator array located on a first side of a wall and a second actuator array located on a second side of the same wall, wherein a length of each actuator of the first actuator array is shorter than half of a width of the wall.

10. The microfluidic device of claim 1, wherein a width of the actuators used for generating a subsequent actuation inducing field is equal to or shorter than a width of the actuators used for generating a first actuation inducing field.

11. The microfluidic device of claim 1, further comprising a pair of centralizing electrodes configured to preset an entry point of the particles before the particles arrive at the sorting electrode arrangement.

12. The microfluidic device of claim 4, wherein the actuators are connected to at least one of a DC voltage source or an AC voltage source.

13. A particle processing device comprising a microfluidic device that comprises:

a microfluidic channel configured to receive a microfluidic flow that comprises a plurality of particles having different characteristics, wherein the microfluidic channel has a plurality of output flow channels;

a first detector configured to detect the location of the particles;

a plurality of actuators located along the direction of the microfluidic flow and defining a sorting electrode arrangement, wherein the plurality of actuators comprise a first conductive pillar array inside the microfluidic channel; and a controller configured to receive signals from the first detector and to provide force field profiles for each of the plurality of particles, wherein each force field profile comprises a plurality of deflection force settings along the direction of the microfluidic flow, wherein the controller is additionally configured to, based on the provided force field profiles, individually address each conductive pillar within the plurality of actuators to generate a plurality of actuation inducing fields along the direction of the microfluidic flow, wherein the actuation inducing fields are configured to generate the deflection force settings in the force field profiles, wherein the plurality of the force field profiles are different for each different particle and are provided to direct each particle in a gradual manner within the sorting electrode arrangement, and wherein the controller is additionally configured to gradually direct at least two different particles simultaneously within the sorting electrode arrangement.

* * * * *